(12) United States Patent
Lutz et al.

(10) Patent No.: US 10,955,351 B2
(45) Date of Patent: Mar. 23, 2021

(54) ADAPTATION DEVICE FOR ADAPTING AN UV-VIS CUVETTE TO PERFORM IN-SITU SPECTROANALYTICAL MEASUREMENTS IN A CONTROLLED ATMOSPHERE

(71) Applicant: CENTRE NATIONAL DE LA RECHERCHE SCIENTIFIQUE, Paris (FR)

(72) Inventors: Lukas Lutz, Paris (FR); Daniel Alves Dalla Corte, Arcueil (FR); Alexis Grimaud, Paris (FR); Jean-Marie Tarascon, Mennecy (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 454 days.

(21) Appl. No.: 15/751,457

(22) PCT Filed: Jul. 28, 2016

(86) PCT No.: PCT/EP2016/067985
§ 371 (c)(1),
(2) Date: Feb. 8, 2018

(87) PCT Pub. No.: WO2017/025337
PCT Pub. Date: Feb. 16, 2017

(65) Prior Publication Data
US 2020/0240919 A1 Jul. 30, 2020

(30) Foreign Application Priority Data

Aug. 11, 2015 (EP) .................................... 15306283

(51) Int. Cl.
*C08L 23/12* (2006.01)
*G01N 21/65* (2006.01)
(Continued)

(52) U.S. Cl.
CPC ................ *G01N 21/65* (2013.01); *G01J 3/44* (2013.01); *G01N 21/05* (2013.01); *C08L 23/12* (2013.01);
(Continued)

(58) Field of Classification Search
CPC  C08L 23/12; C08L 27/18; C08L 61/16; G01J 3/44; G01N 2021/0325;
(Continued)

(56) References Cited

U.S. PATENT DOCUMENTS 6,214,612 B1 * 4/2001 Yamamoto ............. C12Q 1/005
435/287.1
2007/0140902 A1 * 6/2007 Calatzis ................. G01N 27/07
422/400
(Continued)

OTHER PUBLICATIONS

H. Podzuweit et al., "Difference Spectroscopy with Respiratory Membranes of an H2-Oxidizing Microorganism Layered between Two Gas-Permeable, Plastic Foils: A Procedure that Allows Measurements in the Ultraviolet Range," Analytical Biochemistry, vol. 151, 1985, pp. 487-494.
(Continued)

*Primary Examiner* — Sunghee Y Gray
(74) *Attorney, Agent, or Firm* — BakerHostetler

(57) ABSTRACT

An adaptation device is provided for adapting an UV-Vis cuvette to perform in-situ spectroanalytical characterization of redox processes using gas species or solutes in a controlled atmosphere, the device configured to fit the open end of a UV-Vis cuvette intended to contain products to be measured during achievement of spectroanalytical measurements. The device comprises a main body configured to form a lid covering the opened end of the cuvette, the main body having a first part and a second part; a working, a counter and a reference electrode with removable parts at the respective ends of three conductors coming from outside and
(Continued)

passing through the main body; a gas inlet to allow introduction of a gas the gas inlet having one aperture directed to the working electrode and second aperture directed to the bottom of the cuvette, a gas outlet intended to let the reactive gas in excess to flow out of the cuvette and an solution inlet tube for titration measurements.

14 Claims, 4 Drawing Sheets

(51) Int. Cl.
*G01J 3/44* (2006.01)
*G01N 21/05* (2006.01)
C08L 27/18 (2006.01)
C08L 61/16 (2006.01)
G01N 21/03 (2006.01)

(52) U.S. Cl.
CPC ............... *C08L 27/18* (2013.01); *C08L 61/16* (2013.01); *G01N 2021/0325* (2013.01); *G01N 2021/052* (2013.01); *G01N 2021/651* (2013.01)

(58) Field of Classification Search
CPC ....... G01N 2021/052; G01N 2021/651; G01N 21/03; G01N 21/05; G01N 21/65
USPC ......................................................... 356/301
See application file for complete search history.

(56) References Cited

U.S. PATENT DOCUMENTS

2012/0103807 A1   5/2012  Dattelbaum et al.
2017/0030827 A1*  2/2017  Nickel ................... G01N 21/01
2017/0089861 A1*  3/2017  Chen ..................... G01N 27/42

OTHER PUBLICATIONS

M. Dixon, "The Acceptor Specificity of Flavins and Flavoproteins: I. Techniques for Anaerobic Spectrophotometry," Biochimica et Biophysica Acta. Bioenergetics, vol. 226, No. 2, Mar. 2, 1971, pp. 241-258, XP025502535.

J. Cerda et al., "Spectroelectrochemical measurements of redox proteins by using a simple UV/visible cell," Electrochemistry Communications, vol. 33, May 9, 2013, pp. 76-79, XP028679721.

* cited by examiner

ADAPTATION DEVICE FOR ADAPTING AN UV-VIS CUVETTE TO PERFORM IN-SITU SPECTROANALYTICAL MEASUREMENTS IN A CONTROLLED ATMOSPHERE

CROSS-REFERENCE TO RELATED APPLICATIONS

This application is a National Stage of International patent application PCT/EP2016/067985, filed on Jul. 28, 2016, which claims priority to foreign European patent application No. EP 15306283.1, filed on Aug. 11, 2015, the disclosures of which are incorporated by reference in their entirety.

FIELD OF THE INVENTION

The invention relates to the general field of UV-Vis/Raman measurements or analysis. It relates in particular to In-situ spectroscopic analysis of redox processes and, more particularly, to redox processes of $CO_2$ and $O_2$ in organic solvents under controlled atmosphere.

BACKGROUND OF THE INVENTION

Latest research interests in electrochemical manipulation of gases for emerging battery technologies and novel $CO_2$ capturing processes lack of tools fully adapted to achieve spectroanalytical investigation on redox processes in in-situ conditions.

In particular, an accurate understanding of redox processes of $CO_2$ and $O_2$ in organic solvents under controlled atmosphere have a high interest and impact in the energy storage field.

At the same time, there is a high demand in microbiology and biochemistry fields for investigating gas based redox processes as well as for following redox processes caused by means of titrating additives in-situ.

In-situ spectroscopic measurement of redox processes is a common characterization technique used in chemistry and biochemistry. Numerous designs, based on Raman spectro-analysis method for instance, have been developed for such applications. The corresponding equipment generally employs standard containers, called spectrochemical cells, to contain the sample to be analyzed.

FIG. 1 shows an example of a standard equipment 11 usable for in-situ Raman experiments and using a cell 12 assembled in a so called thin layer spectrochemical cell. Cell 12 comprises, in a usual manner, three electrodes, namely a working-electrode 13, a counter-electrode 14 and a reference-electrode 15, and a gas inlet 16 and gas outlet 27 (oxygen gas for example). Those elements are placed in a cuvette 17 through its opened end 18 intended to contain the solution 19 to be analyzed.

Thin layer spectrochemical cells for UV-Vis, Raman and IR analyses like those developed by Bio-Logic Company or by BASi Company for instance, are commercially available. However, as it can be seen on FIG. 1, they are open cells in which the sample is exposed to the open air so that the sample is very likely to be contaminated by its environment during the measurement process.

That why, as redox processes involving gas species, like redox processes of $CO_2$ and $O_2$ in organic solvents, require a controlled atmosphere, these processes are generally only characterized by in-situ electrochemical techniques. The fact that spectroscopic characterizations with existing equipment have to be done ex situ, by collecting analysis samples in a protected atmosphere and maintained in such protected atmosphere during characterization process, renders such characterization difficult and tedious, to implement.

There are known methods making it possible to perform atmosphere controlled spectroscopy measurements, mainly for IR (infrared) measurements.

However, these known methods for spectroelectrochemical measurements in gas-tight setups, rely on the use of cells with a configuration much more complex than that of the cells commonly used with existing analysis equipment.

Consequently, to be able to perform such atmosphere controlled measurements, the commercially available spectroscopic instruments have to be modified in order to accept those kinds of cell with specific geometries.

Moreover cells adapted to spectroelectrochemical measurements in gas-tight setups are often configured such that they offer a very low yield for redox reactions involving gas reactants insofar as the working-electrode is generally disposed in the optical pathway of the analyzing beam.

Indeed, as it is located in the optical pathway, the electrode cannot receive a flow of gas liable to affect the spectroscopic response and then, the amount of gas reactant that reaches the electrode is limited by the initial amount of solvated gas in the solution, this initial concentration depleting quickly (i.e. within seconds) during the measurement.

Similarly to what happens when achieving spectroanalytical investigations on redox processes in in-situ conditions, in-situ titration of air sensitive reactants with UV-Vis analyzers is limited by the complex geometries of the measurement cells that can be used, as well as by the required modifications to be made to the existing instruments.

Indeed, the titration of low volumes quantities of reactants is made difficult due to the stirring of the solution which is required to achieve such titration, insofar as most of commercially available UV-Vis instruments do not have built-in magnetic stirrer and insofar as the standard low volumes cells here employed are not big enough to contain such a magnetic stirrer.

SUMMARY OF THE INVENTION

One aim of the invention is to propose a solution making it possible to achieve spectroanalytical investigations on redox processes in in-situ conditions, using as much as possible commercially available instruments, and especially commercial UV-Vis instruments.

Another aim of the invention is to propose a solution making it possible to obtain the best yield for the redox reactions which are object of the measurement.

For this purpose an object of the invention is an adaptation device for adapting an UV-Vis or Raman cuvette to perform in-situ spectroanalytical characterization of redox processes using gas species or titrated redox active species in a controlled atmosphere, said device being configured so as to fit the open end of a UV-Vis cuvette intended to contain products to be measured during achievement of spectroanalytical measurements. The device according to the invention comprises:

a main body configured to form a plug closing the opened end of the cuvette a working, a counter and a reference electrodes with removable parts mounted removably at the respective ends of conductors passing through the main body;

a gas inlet intended to allow introduction of an oxidation or reduction gas (reactive gas) into the cuvette, said gas inlet having a first aperture directed towards the working electrode and a second aperture directed towards the bottom of the cuvette;

a gas outlet intended to let the gas in excess to flow out of the cuvette.

According to a particular feature of the device according to the invention, the main body has a first part and a second part. The first part is intended to make it possible to remove the device from the cuvette easily, whereas the second part is intended to be introduced in the cuvette and having an external size substantially equal to the size of the opened end of the cuvette.

According to another feature of the invention, the main body is made of a material thermally stable and chemically inert.

According to another feature of the invention the main body is made of Polytetrafluoroethylene (PTFE), of Polyetheretherketon (PEEK) or of Polypropylene (PP).

According to another feature of the invention the main body comprises a sealing ring arranged at the periphery of the second part of the main body intended to be introduced in the opened end of the cuvette.

According to another feature of the invention the sealing ring is made of Polytetrafluoroethylene (PTFE).

According to another feature the device according to the invention comprising a solution inlet aperture configured to be closed when it is not in use during measurement process.

According to another feature of the invention, the length of the gas inlet inside the cuvette is sized in such a way that the first aperture be arranged along the length of the gas inlet so as to be located close to the working electrode whereas the second aperture is located relative to the bottom of the cuvette so as to stir the solution in the whole volume of the cuvette, by bubbling, without affecting the spectrochemical measurement.

According to another feature of the invention the ends of the gas inlet and of the gas outlet located outside the cuvette are fitted with shutoff valves in order to allow a complete insulation from the open air of the solution contained in the cuvette.

According to another feature of the invention the material of the working electrode and of the counter electrode is chosen such that it promotes an electrochemical active surface towards the precursor species, being gases or solutes.

According to another feature of the invention the working electrode and the counter electrode are made of gold, platinum or in carbon.

According to another feature of the invention the reference electrode is made of silver or of platinum.

According to another feature of the invention the counter electrode is made of gold, platinum or carbon.

Another object of the invention is a method for performing an UV-Vis or Raman measurement with a measuring instrument using a standard cuvette and an adaptation device according to the invention, said method comprising:

introducing an empty cuvette inside an enclosure containing inert atmosphere, filling up the cuvette with the solution to be measured, fitting the adaptation device to the opened end of the cuvette so as to seal said opened end, removing the cuvette from the enclosure, and placing the cuvette in an appropriate housing of the measuring instrument.

According to particular feature, the method of the invention further comprises:

connecting the gas inlet to a gas pipe;

connecting the working electrode, the counter electrode and the reference electrode to the corresponding outlets of a workstation of the measuring instrument;

applying an operating voltage or current between the working electrode and the reference electrode, opening the shutoff valve of said gas inlet to let the oxidation gas flowing in the cuvette.

The main body with the different elements here above mentioned form the adaptation device according to the invention that is plugged into the opened end of the cuvette.

In comparison with setups for UV-Vis measurements according to the state-of-the-art, the present invention makes it possible to achieve in-situ spectroscopic characterization (UV-Vis) of redox processes using gas species in a controlled atmosphere.

The adaptor device according to the invention provides various main advantages. In particular it makes it possible:

to obtain, using commercially available cells 12, air-tight electrochemical cells usable for redox process and UV-Vis measurements under controlled atmosphere in organic or aqueous media;

to perform gas management of the cell 12, through reflux-free inlet and outlet connections, so that the gas flow and composition can be switched and/or tuned during the experiments while always keeping a controlled atmosphere;

to have an optimized structure to achieve redox processes using gas reactants, insofar as the flow of gas reactants can be precisely directed to the working electrode which increases the amount of charge transfer during the electrochemical measurements;

to be able to use among various electrodes those particularly adapted for achieving a given process;

to be able to achieve titration measurements using the solution inlet that the device according to the invention can comprise and which enables investigation on chemical reduction by additives under dry atmosphere;

to be able to use one and the same gas inlet to both feed the cell with gas reactant and stir the solution, given that, as the flow of gas reactant can be replaced by a flow of inert gas in the case of titration techniques, stirring the solution with a gas flow remains possible.

Furthermore, as this device is compatible with standard UV-Vis cuvettes, it provides access, using a non-complex and inexpensive adaptation of UV-Vis standard measuring equipment, to a wide range of new Raman spectroscopy measurement possibilities.

DESCRIPTION OF THE DRAWINGS

All the features and advantages of the invention will be better understood thanks to the following description which refers to the appended figures which show.

In the aforementioned drawings, a same functional element is referred to by the same reference number.

DETAILED DESCRIPTION OF THE INVENTION

Figure 2:
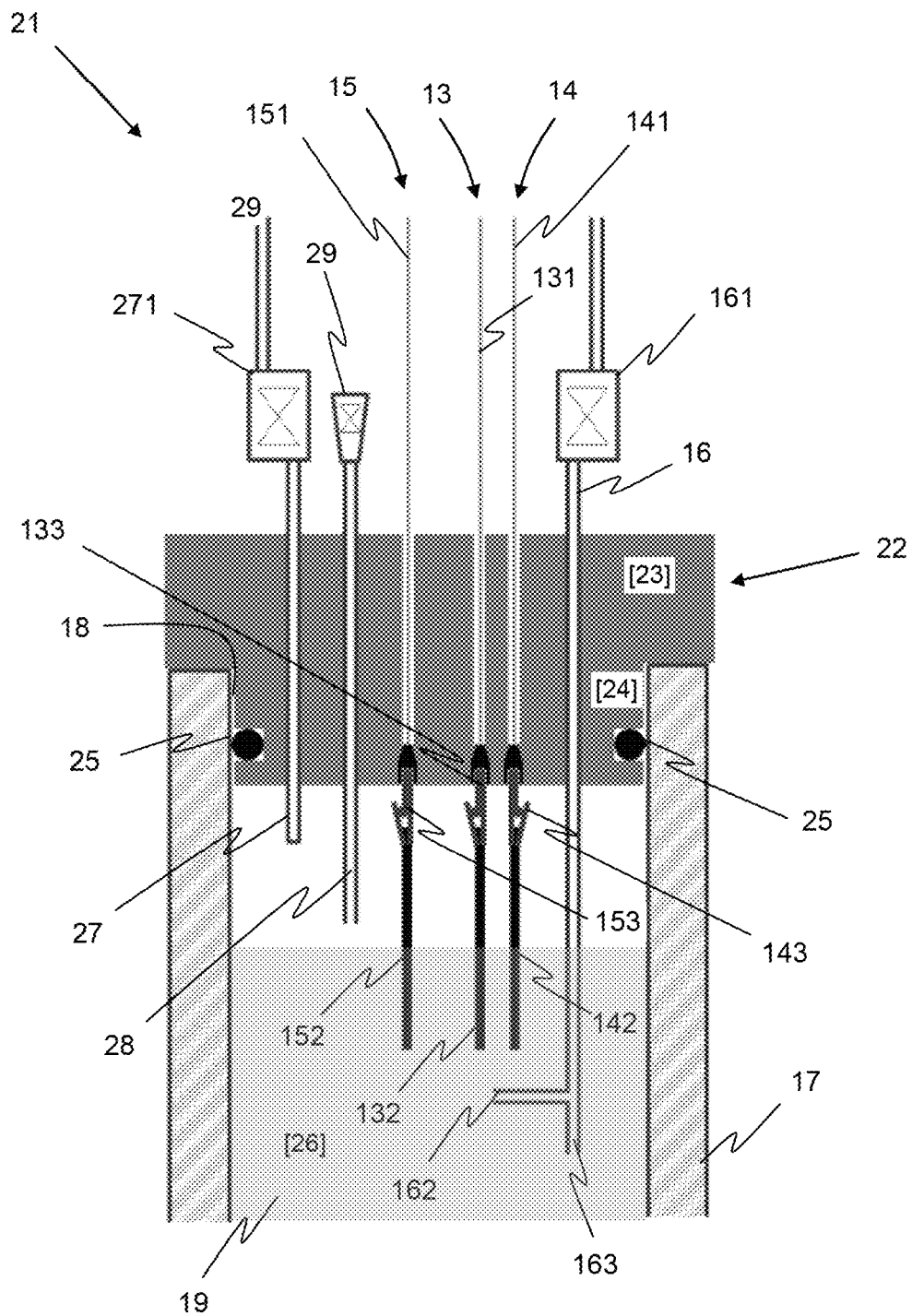
FIG. 2, a detailed schematic illustration of the device according to the invention.
Figure 3:
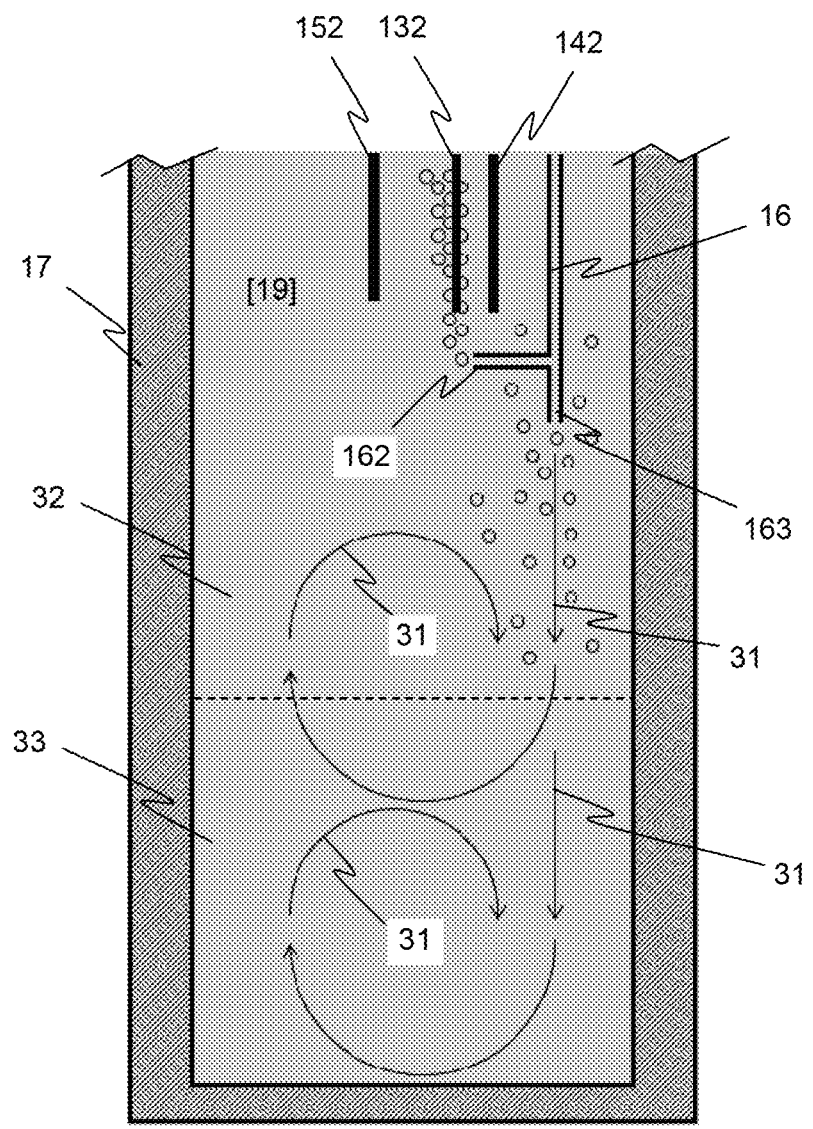
FIG. 3, an illustration of the stirring effect induced in the sample solution by the use of the device according to the invention.

FIGS. 2 and 3 illustrate the main structural characteristics of the device 21 according to the invention through a particular embodiment.

Figure 1:
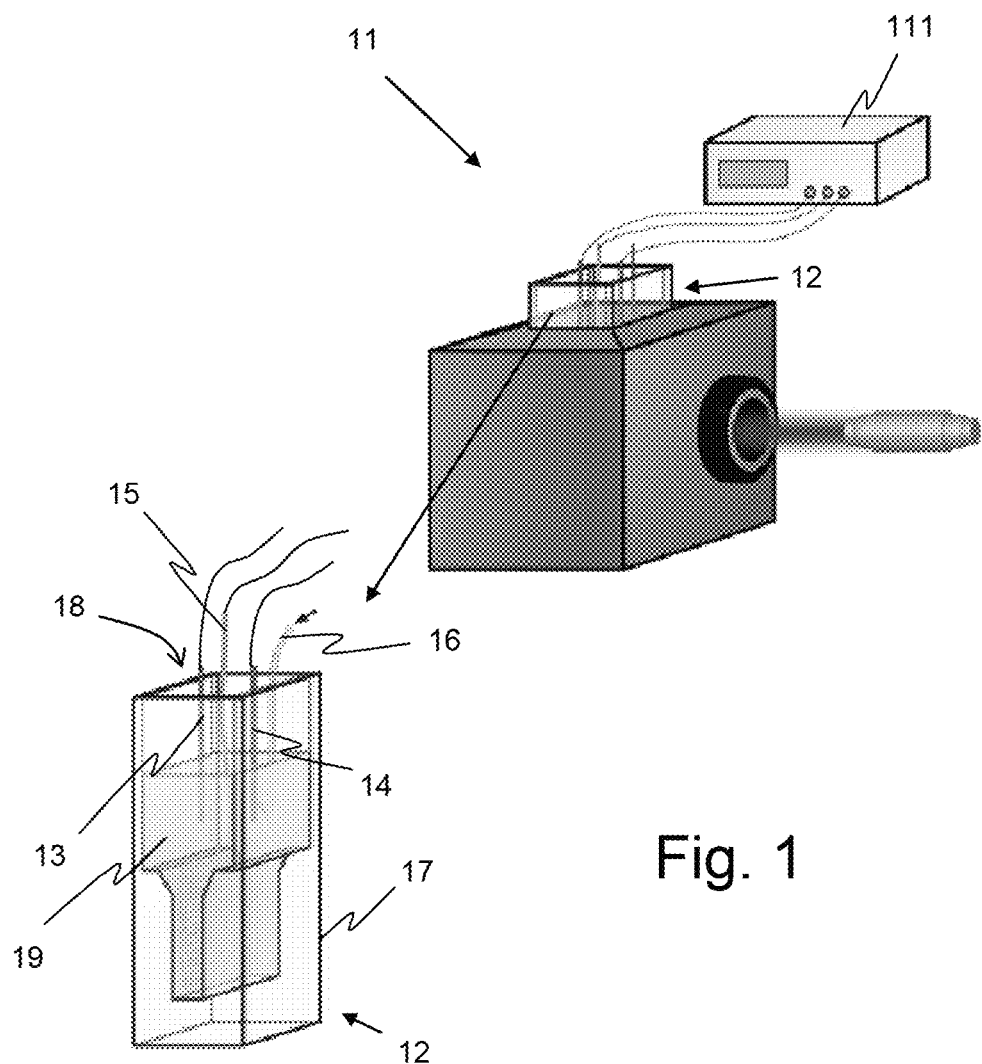
FIG. 1, an example of a standard spectroelectrochemical measurements equipment 11 for which the device according to the invention is adapted.

As schematically illustrated on FIG. 2, the device 21 according to the invention comprises a main body 22 forming a plug intended to seal the opened end 18 of the cuvette 17 of a cell, like the cell 12 shown on FIG. 1.

For this purpose main body 22 includes a first part 23 dimensioned so as to form a lid covering the opened end of the cuvette 17 and a second part 24 intended to be inserted inside the cuvette 17 through the opened end 18.

First part 23 which is not inserted in the cuvette 17 makes it possible to remove the device 21 from the cuvette easily.

The outer dimensions (8 mm in height, 9 mm in diameter) of the second part 24 are defined to be substantially the same as the inner dimensions of the opened end of the cuvette so as to plug the opened end of the cuvette 17.

According to an embodiment of the invention, the main body 22 comprises a seal 25 located in a groove formed on the outside periphery of the second part 24, near the free end thereof, as illustrated on FIG. 2. The seal 25 ensures a complete sealing of the cuvette at its opened end 18. Such sealing makes the junction between the cuvette 17 and the body 22 of the device completely gas-tight and liquid-tight. This prevents, in particular, the penetration of external atmosphere inside the cuvette 17, thereby providing a gas-tight environment for the investigation of sensitive species in a protected atmosphere.

The seal 25 has preferably the shape of an O-ring.

According to an embodiment of the invention, the main body 22 is made of a thermoplastic polymer material chosen for its properties of resistance against attacks by chemical agents.

In a preferred embodiment the main body is made of polytetrafluoroethylene (PTFE), this material being chosen for its characteristics of elasticity, its resistance against chemical agents and its low friction coefficient.

Alternately, the main body can also be made of Polyetheretherketon (PEEK) or of Polypropylene (PP).

The seal 25 is preferably made of an elastic material providing a good sealing, with a good chemical resistance. In a preferred embodiment seal 25 is an O-ring also made of polytetrafluoroethylene (PTFE).

The device according to an embodiment of the invention also comprises three electrodes, a working electrode 13, a counter electrode 14 and reference electrode 15, which pass through the thickness of the main body from the free end of the first part 23 in contact with the open air to the free end of the second 24 part in contact with the cavity 26 of the cuvette 17. These three electrodes a sized in such a way that when the main body 22 is fitted on the cuvette 17, their extremities are immerged in the solution to be analyzed, as illustrated on FIG. 2.

The working electrode 13 as well as the counter electrode 14 and the reference electrode 15 comprise each a fixed part made by a metallic wire 131, 141 or 151 which passes through the main body 22 and is sealed inside the main body, and by a removable metallic terminal part 132, 142 or 152 which is in contact with the solution contained in the cuvette 17. In a preferred embodiment the removable terminal part 132, 142 or 152 can be connected to the fixed part, 131, 141 or 151 respectively, by holding means such as a metallic clamp 133, 143 or 153, as illustrated on FIG. 2 for instance.

Concerning the working electrode 13 and the counter electrode 14, the removeable metallic terminal parts are made of a metal chosen in relation to the chemical reaction which takes place in the solution and, in particular, in relation to the products involved in that reaction. However, the terminal moveable parts are preferably made of gold, platinum or of carbon.

The reference electrode 15 is as for it made of a metal chosen depending on the stability of the reference potential required by the experiment (measurement) to perform. However, reference electrode is generally made of platinum or of silver.

Apart the aforementioned electrodes, the device 21 according to an embodiment of the invention also comprises a gas inlet including a tube 16 intended to allow introduction of a reactive gas (i.e. oxidation or reduction gas) in the solution. Said tube passes through the main body 22 and is sealed inside the main body. As illustrated on FIG. 2, such tube terminates in the cavity of the cuvette 17 so as to be partially immersed in the solution contained in the cuvette 17.

The device 21 also comprises a gas outlet made by a tube 27 intended to let the gas in excess to flow out of the cuvette (17). Said tube passes through the main body 22 and is sealed inside the main body. The gas outlet tube 27 ends in the cavity 26 of the cuvette 17 in an emerged part of the cavity, as shown on FIG. 2. The emerged part of the cavity 26 is defined as the part of the upper part of the cavity, which is not filled with the solution.

The gas outlet 27 is intended to let the oxidation gas in excess to flow out of the cuvette 17.

According to an embodiment of the invention, each of the gas inlet tube 16 and of the gas outlet tube 27 is terminated out of the cuvette 17 by a termination element 161 or 271 respectively, a gas valve for instance.

This element is intended to insulate the cavity of the cuvette 17 in which the said tubes terminate, from the external atmosphere with which the tubes communicate by their opposite end. Advantageously, this element 161 or 271 may be connected to a dispositive to avoid reflux of the gas, a bubbler or a gas control vane for instance.

Concerning the arrangement of the various aforementioned tubes and electrodes inside the cavity of the cuvette 17 relative to each other, it is to be considered that, according to the invention, the working electrode 13 and the counter electrode 14 are arranged so that their ends are close one to the other and close to an end aperture of the gas inlet tube 16. In a preferred embodiment, the gas inlet tube 16 has one aperture 162 that is directed towards the working electrode 13 so as to increase the amount of gas species in contact with the working electrode.

In such a configuration, the gas supplied to the cavity 26 of the cuvette 17 through the gas inlet 16 is dispersed in the solution 19 in the form of bubbles, around the electrodes 132 and 142, which promotes the reaction between the components of the solution and the injected gas and hence, the yield of the reaction.

The reference electrode, as for it, is arranged so as to be located in the vicinity of the working electrode and the counter electrode in order to provide a relevant potential reference.

In order to make it possible to implement some specific measurements, titration measurements for instance, the device according to an embodiment of the invention may also comprise a solution inlet including an inlet tube 28 which passes through the main body 22 and terminates inside the cavity 26 of the cuvette 17. The opposite end of the tube 28, outside the cuvette 17, is fitted with a nozzle 29 configured to be connected to a syringe (not shown) during a titration experiment, to inject additional solution for instance. The nozzle 29 ensures the sealing of the end of the tube 28 when no injection of additional solution is required.

According to a preferred embodiment of the device 21, the gas inlet tube 16 is configured to have a double opened termination at its end located inside the cavity 26 of the cuvette 17, a first upper termination 162 directed towards the working electrode (13) as described above and a second lower termination 163 directed towards the bottom of the cuvette 17 in order to disperse gas bubbles all inside the upper part (area) 32 of the cavity so as to induce a stirring motion of the entire solution present in the cuvette, as illustrated by arrows 31 on FIG. 3. According to the invention, this second termination 163 is preferably arranged at a distance from the bottom of the cuvette 17 such that the gas bubbles do not reach the lower part (area) 33 of the cavity in which UV-Vis measurements are performed.

It is to be noticed that at least some of the different elements of the device 21 (wires 131, 141 and 151, as well as tubes 16 and 27 for instance), as described above, are permanently integrated in the main body 22, during the manufacturing of the device, so that these elements are made integral with the main body 22. Thus, device 21 advantageously forms a single element.

As it has been described in the previous paragraphs, the adaptation device according to the invention makes it possible to use existing equipment to perform, in a non-controlled environment, measurements requiring to be performed in a controlled atmosphere.

Thanks to the use of the device according to the invention, the part of the measurement process that must be necessarily performed under controlled atmosphere is advantageously limited to the phase of filling up the cuvette 17 with the solution to be measured.

Thus the method to achieve an UV-Vis or Raman measurement using a standard cuvette 17 and an adaptation device 21 according to the invention includes a fulfillment phase comprising the following preliminary actions, which take place before the measurement steps themselves:
introducing an empty cuvette 17 inside an enclosure containing inert atmosphere,
filling up the cuvette 17 with the solution 19 to be measured while the cuvette 17 is still located in the enclosure,
fitting the adaptation device 21 on the opened end 18 of the cuvette 17 so as to seal the opened end;
removing the cuvette 17 from the enclosure.

At the end of the fulfilment phase, the measurement is ready to be performed in a normal, i.e. non-controlled, atmosphere.

For instance, the implementation of an in-situ spectroscopic characterization (UV-Vis, Raman) of redox processes using gas species in a controlled atmosphere may start by:
placing the pre-filled cuvette 17 in the appropriate housing of the instrument
connecting the gas inlet 16 to a gas pipe, an oxygen pipe for instance;
connecting the working electrode 13, the counter electrode 14 and the reference electrode 15 to the corresponding outlets of the workstation 111 of the measuring instrument (as shown on FIG. 1);
applying the operating voltage, or operating current, between the working electrode 13 and the reference electrode 15;
and opening the shutoff valve of said gas inlet 16 to let oxygen flowing in the solution 19 contained in the cuvette 17.

The following paragraphs describe a practical experiment showing that the device according to an embodiment of the invention makes it possible to perform, in a simple manner, spectral analysis of chemical reactions which ordinarily need to be performed in a completely inert environment.

This practical experiment is intended to identify the presence of particular chemical components called sodium superoxide/peroxide $NaO_2/Na_2O_2$ in a solution of NaTFSi (0.5 M) dissolved in Dimethylacetamide (DMA), using UV-Vis spectroanalysis, Such an experiment is normally possible only if the solution is maintained in atmospherically inert conditions. Otherwise $NaO_2/Na_2O_2$ components would be altered and degraded by humidity present in a normal atmosphere so that the spectroanalysis results would certainly be unsignificant.

The implementation of this experiment which encompasses the steps previously described follows the next following steps:
a) Under dry conditions (glove-box, dried solvents and salts), NaTFSi (0.5 M) is dissolved in Dimethylacetamide (DMA). Enough solution to cover the all electrodes is then transferred, under Argon atmosphere into a commercially available UV-Vis cuvette 17.
b) The cuvette 17 is sealed with the device according to an embodiment of the invention 21 equipped with a curled Gold wire as working electrode 13, a curled Platinum wire as counter electrode 14 and a Silver wire as reference (quasi-reference) electrode 15.
c) The cell so formed is then placed in a commercial UV spectrometer,
d) A supply gas line is connected to the gas inlet 16 and electrodes are connected to a commercial potentiostat (voltage generator of the workstation 111).
e) The solution 19 is first saturated with Argon and a potential of −1.1V vs the reference electrode 15 is applied;
f) Subsequently blank absorption spectra is taken every 10 minutes during a given period;
g) The working gas is then changed to oxygen and while saturating the solution inside the cuvette with oxygen, a potential of −1.1V vs the reference electrode 15 is applied (i.e. potential of oxygen reduction).
h) Absorption spectra of the in-situ created $Na_xO_y$ species is taken every 10 minutes during 60 minutes.

Figure 4:
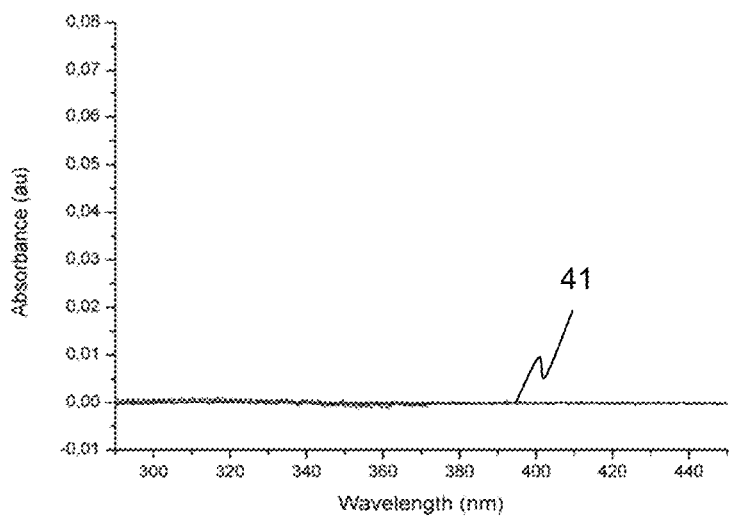
FIGS. 4 and 5, graphs related to an experiment that illustrates the advantageous character of the device according to the invention.

The diagram of FIG. 4 shows the results of the measurements made on the Argon saturated solution obtained at step f).

As it can be seen, flat curves 41 show that no particular spectral response (line) can be identified in the spectral range specifically explored (between 280 and 440 nm) whatever the duration of the analysis. This observation confirms that, due to the presence of the device according to an embodiment of the invention which seals the cuvette 17, no contamination of the solution by a non-inert atmosphere can be identified. It also confirms that no redox reaction can take place in that solution without oxygen presence.

Figure 5:
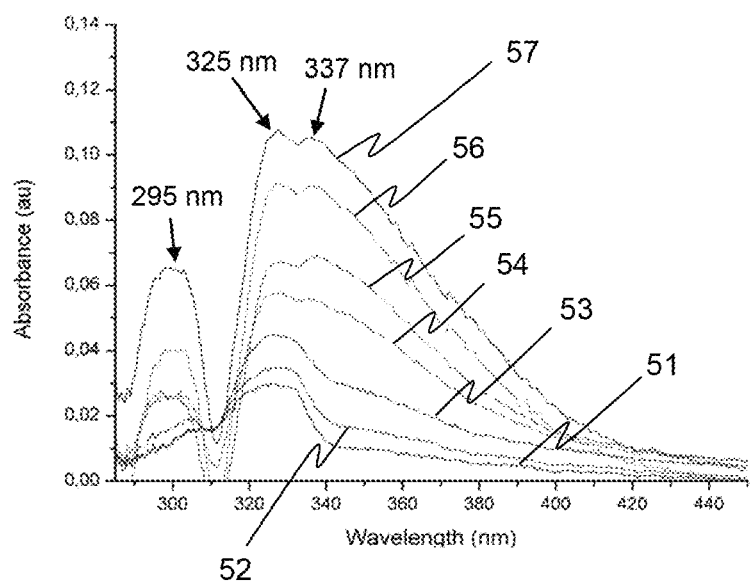

The diagram of FIG. 5 shows the results of the successive spectral measurements made on the oxygen saturated solution obtained at step g).

Curves 51 to 57 of this diagram illustrate the growth of three absorption peaks at 295, 325 and 337 nm, which correspond to the reference spectrum of $Na_2O_2$, during the first 60 minutes each curve corresponding to an analysis made every 10 minutes. Such absorption spectrum clearly indicates the presence of $Na_2O_2$ in the solution, this element being normally decomposed through humidity of ambient air.

The above described experiment illustrates the fact that, during the reduction of oxygen in presence of a sodium salt, even in high donor number solvents, the appearance of sodium peroxide which becomes predominately present in the solution can be advantageously detected by a conventional UV-Vis measuring equipment when the cuvette containing the solution of sodium salt is equipped with the device according to an embodiment of the invention.

Spectroanalysis can be thus employed to identify a given element, a sodium oxide for instance, contained in a solution, even if the considered analysis requires the solution containing the said element to be insulated from the open air.

The invention claimed is:

1. An adaptation device for adapting an UV-Vis or Raman cuvette to perform in-situ spectroanalytical characterization of redox processes using gas species or titrated redox active species in a controlled atmosphere, said device being configured so as to fit an open end of a UV-Vis or Raman cuvette intended to contain products to be measured during achievement of spectroanalytical measurements, wherein the device comprises:
   a main body configured to form a plug closing the opened end of the cuvette;
   a working electrode a counter electrode and a reference electrode with removable parts mounted removably at respective ends of conductors passing through the main body;
   a gas inlet tube passing through the main body which terminates in a cavity of the cuvette so as to be partially immersed in a solution contained in the cuvette, said gas inlet tube being intended to allow introduction of a reactive gas in the solution;
   a gas outlet tube passing through the main body which terminates in the cavity of the cuvette in an emerged part of the cavity, said gas outlet tube being intended to let the gas in excess to flow out of the cuvette;
   the gas inlet tube being configured to have a double opened termination at its end located inside the cavity of the cuvette, a first upper termination directed towards the working electrode and a second lower termination directed towards the bottom of the cuvette, said second termination being arranged at a distance from the bottom of the cuvette such that gas bubbles do not reach a lower part of the cavity in which UV-Vis or Raman measurements are performed.

2. The adaptation device according to claim 1, wherein the main body having a first part and a second part the first part being intended to make it possible to remove the device from the cuvette easily; the second part being intended to be introduced in the cuvette and having an external size substantially equal to the size of the opened end of the cuvette.

3. The adaptation device according to claim 1, wherein the main body is made of a material thermally stable and chemically inert.

4. The adaptation device according to claim 3, wherein the main body is made of Polytetrafluoroethylene, Polyetheretherketon or Polypropylene.

5. The adaptation device of claim 4, wherein the sealing ring is made of Polytetrafluoroethylene.

6. The adaptation device according to claim 1, further comprising a sealing ring arranged at the periphery of the second part of the main body intended to be introduced in the opened end of the cuvette.

7. The adaptation device according to claim 1, further comprising a solution inlet aperture configured to be closed when it is not in use during measurement process.

8. The adaptation device according to claim 1, wherein a length of the gas inlet tube inside the cuvette is sized in such a way that a first aperture be arranged along the length of the gas inlet so as to be located close to the working electrode whereas a second aperture is located relative to the bottom of the cuvette so as to stir the solution in the whole volume of the cuvette, by bubbling, without affecting a spectrochemical measurement.

9. The adaptation device according to claim 1, wherein the ends of the gas inlet tube and of the gas outlet tube located outside the cuvette are fitted with shutoff valves in order to allow a complete insulation from open air of the solution contained in the cuvette.

10. The adaptation device according to claim 1 wherein the material of the working electrode and of the counter electrode is chosen such that it promotes an electrochemical active surface towards the precursor species, being gases or solutes.

11. The adaptation device according to claim 10, wherein the working electrode and the counter electrode are made of gold, platinum or of carbon.

12. The adaptation device according to claim 1, wherein the reference electrode is made of silver or of platinum.

13. A method for performing an UV-Vis or Raman measurement with a measuring instrument using a standard cuvette and an adaptation device according to claim 1, comprising:
   introducing an empty cuvette inside an enclosure containing inert atmosphere,
   filling up the cuvette with the solution to be measured,
   fitting the adaptation device to a opened end of the cuvette so as to seal said opened end,
   removing the cuvette from the enclosure, and placing the cuvette in an appropriate housing of the measuring instrument.

14. The method of claim 13 further comprising:
   connecting the gas inlet to a gas pipe;
   connecting the working electrode, the counter electrode and the reference electrode to the corresponding outlets of a workstation of the measuring instrument;
   applying an operating voltage or current between the working electrode and the reference electrode,
   opening a shutoff valve of said gas inlet to let oxidation gas flowing in the cuvette.

* * * * *